US008451461B2

(12) United States Patent
Suzuki

(10) Patent No.: US 8,451,461 B2
(45) Date of Patent: May 28, 2013

(54) INFORMATION PROCESSOR, INFORMATION PROCESSING SYSTEM, AND COMPUTER READABLE MEDIUM

(75) Inventor: Akihiro Suzuki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1019 days.

(21) Appl. No.: 12/195,014

(22) Filed: Aug. 20, 2008

(65) Prior Publication Data

US 2009/0174911 A1 Jul. 9, 2009

(30) Foreign Application Priority Data

Jan. 4, 2008 (JP) ................................. 2008-000042

(51) Int. Cl.
*H04N 1/04* (2006.01)
(52) U.S. Cl.
USPC ............ 358/1.1; 358/401; 358/501; 358/474; 399/381; 399/391; 399/382
(58) Field of Classification Search
USPC ..................... 399/381, 391; 358/1.1, 401, 501
See application file for complete search history.

(56) References Cited

U.S. PATENT DOCUMENTS

| | | | |
|---|---|---|---|
| 6,415,117 B1 * | 7/2002 | Bates et al. ...................... | 399/84 |
| 7,089,487 B2 * | 8/2006 | Tsai ............................... | 715/208 |
| 7,791,755 B2 * | 9/2010 | Mori ............................. | 358/1.18 |
| 2003/0038988 A1 * | 2/2003 | Anderson et al. ............. | 358/474 |

FOREIGN PATENT DOCUMENTS

| | | | |
|---|---|---|---|
| JP | 06-314303 A | 11/1994 | |
| JP | 2002-24258 A | 1/2002 | |
| JP | 2004-254050 A | 9/2004 | |
| JP | 2005-115572 A | 4/2005 | |

OTHER PUBLICATIONS

Japanese Office Action dated Dec. 15, 2009 in Japanese Application No. 2008-000042.

* cited by examiner

*Primary Examiner* — King Poon
*Assistant Examiner* — Lawrence Wills
(74) *Attorney, Agent, or Firm* — Sughrue Mion, PLLC

(57) ABSTRACT

An information processor includes: a first acquiring unit that acquires image information of a plurality of pages formed by reading copies of a plurality of pages with an image reading unit; a second acquiring unit that acquires image information composed of at least one page formed by reading the copy of at least one page selected from the copies of the plurality of pages by the image reading unit; and an outputting unit that outputs the image information composed of the plurality of pages divided in accordance with the page specified on the basis of the image information of at least one page of the image information of the plurality of pages.

4 Claims, 9 Drawing Sheets

INFORMATION PROCESSOR, INFORMATION PROCESSING SYSTEM, AND COMPUTER READABLE MEDIUM

CROSS-REFERENCE TO RELATED APPLICATIONS

This application is based on and claims priority under 35 U.S.C. 119 from Japanese Patent Application No. 2008-000042 filed Jan. 4, 2008.

BACKGROUND

1. Technical Field

The present invention relates to an information processor, an information processing system, and a computer readable medium.

2. Related Art

There is a device in which a specific document delimiting copy is previously inserted between documents before a plurality of document copies are read so that when the copies are continuously read by an image scanner, the document delimiting copy is recognized to register the images of the copies respectively for document units.

SUMMARY

According to an aspect of the present invention, an information processor includes: a first acquiring unit that acquires image information of a plurality of pages formed by reading copies of a plurality of pages with an image reading unit; a second acquiring unit that acquires image information composed of at least one page formed by reading the copy of at least one page selected from the copies of the plurality of pages by the image reading unit; and an outputting unit that outputs the image information composed of the plurality of pages divided in accordance with the page specified on the basis of the image information of at least one page of the image information of the plurality of pages.

BRIEF DESCRIPTION OF THE DRAWINGS

Exemplary embodiment of the present invention will be described in detail based on the following figures, wherein.

DETAILED DESCRIPTION

Figure 1:
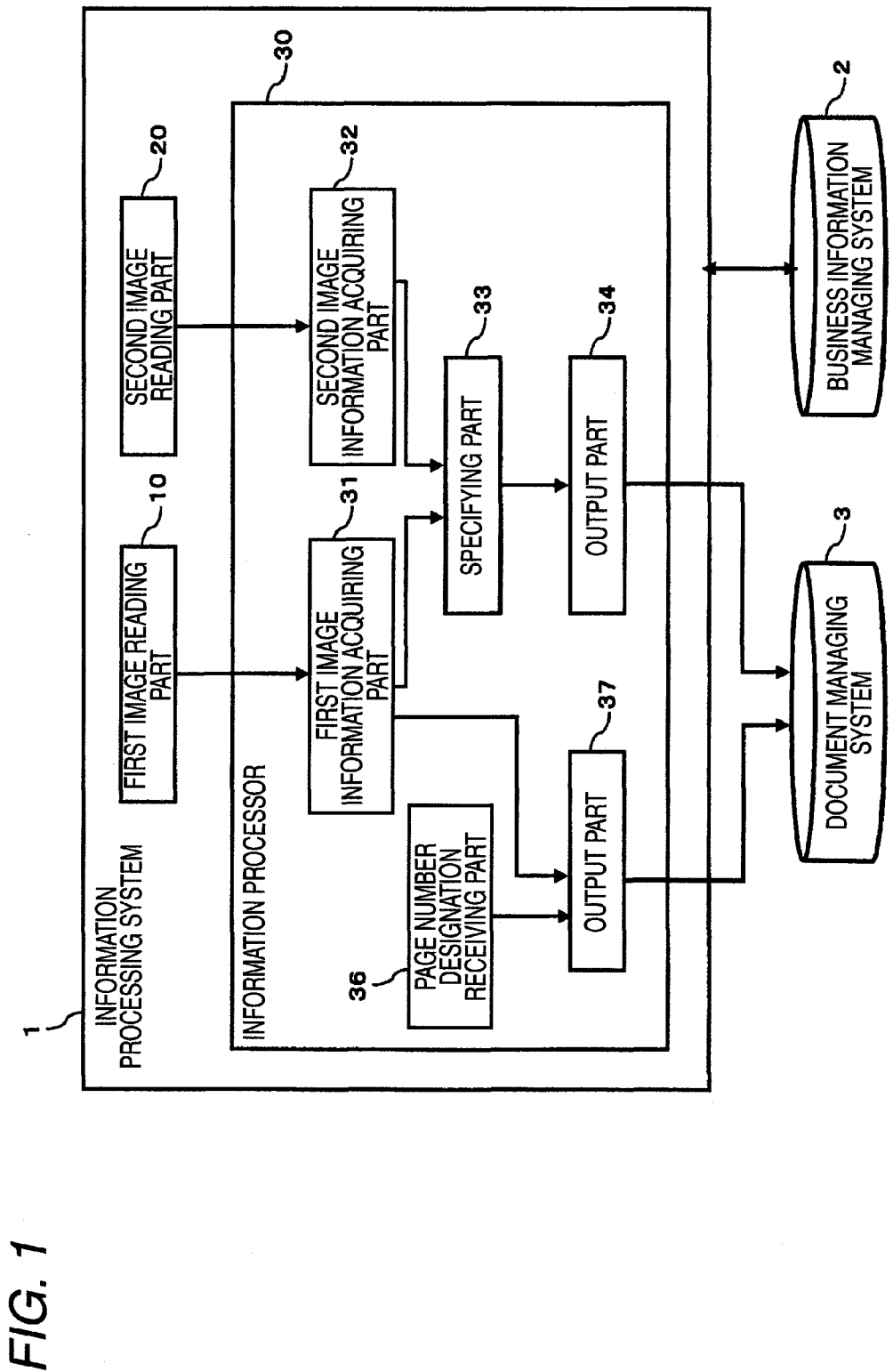
FIG. 1 is a block diagram showing one example of a structure of an information processing system according to an embodiment.

Now, an embodiment of the present invention will be described below by referring to the drawings.

(Structure of Information Processing System)

FIG. 1 is a block diagram showing one example of a structure of an information processing system 1 according to the embodiment. This information processing system 1 reads copies of a plurality of pages to form image information of the plurality of pages and divides the image information of the plurality of pages to store the image information in a prescribed storage device. The information processing system 1 may be physically realized by one device or by a plurality of devices. According to one form, the information processing system 1 is a compound machine having a scanning function, a printing function and a copying function.

In FIG. 1, the information processing system 1 has a first image reading part 10, a second image reading part 20 and an information processor 30.

The first image reading part 10 reads the copies of the plurality of pages to form the image information of the plurality of pages. The first image reading part 10 is, for instance, a scanner that optically reads the copies of the plurality of pages in order by an automatic copy feeder to form electronic image information.

The copies of the plurality of pages are, for instance, a plurality of paper documents. As the paper documents, for instance, proofs (a written estimate, an order form, a bill of parcel, a receipt, a written contract, a written application, etc.) may be exemplified, however, the paper documents are not limited thereto.

The second reading part 20 reads the copy of at least one page selected from the copies of the plurality of pages to form image information of at least one page. The second reading part 20 is, for instance, a scanner that optically reads the copy of at least one page in order by an automatic copy feeder to form electronic image information. As the second image reading part, a device may be used that can fetch copy information such as a writing or image camera or a digital camera as well as the scanner and the second image reading part is not limited to the scanner.

The above-described copy of at least one page serves as a reference of a division position when the image information of the plurality of pages is divided.

The first image reading part 10 and the second image reading part 20 may be realized by a single scanner.

The information processor 30 is a device that acquires the image information of the plurality of pages formed by the first image reading part 10 and divides and outputs the image information of the plurality of pages. The information processor 30 may control the entire part of the information processing system 1. The information processor 30 is, for instance, a computer realized, in one form, by the cooperation of hardware resources and software. Specifically, the function of the information processor 30 is realized by reading an information processing program recorded on a recording medium to a main memory and executing the information processing program by a CPU (Central Processing Unit). The information processing program can be recorded on and provided by the recording medium such as a CD-ROM that can be read by a computer or can be provided as a data signal by a communication. In this case, the function of the information processor 30 may be realized only by hardware.

The information processor 30 includes a first image information acquiring part 31, a second image information acquiring part 32, a specifying part 33 and an output part 34.

The first image information acquiring part 31 acquires the image information of the plurality of pages formed by reading the copies of the plurality of pages through the first image reading part 10.

The second image information acquiring part 32 acquires the image information of at least one page formed by reading the copy of at least one page selected from the copies of the plurality of pages through the second image reading part 20.

The specifying part 33 compares the image information of the plurality of pages acquired by the first image information acquiring part 31 with the image information of at least one page acquired by the second image information acquiring part 32 to specify a selected page of the plurality of pages. Specifically, the specifying part 33 specifies the page substantially corresponding to the image information of the selected page of the image information of the plurality of pages. In deciding whether or not the image information corresponds to each other, the specifying part 33 may collate the image information having a bit map form, or collate text information extracted from the image information respectively.

The output part 34 divides and outputs the image information of the plurality of pages acquired by the first image information acquiring part 31 in accordance with the page specified by the specifying part 33. Specifically, the output part 34 divides and outputs the image information of the plurality of pages by considering the specified page (that is, the selected page) to be a reference of a division position. Namely, the output part 34 divides the image information of the plurality of pages at the division positions specified on the basis of the specified page and outputs the divided image information.

In one embodiment, the output part 34 divides the image information of the plurality of pages and stores the image information in a prescribed storage device. For instance, the output part 34 divides the image information of the plurality of pages to form a plurality of electronic documents, associates the formed electronic documents respectively with document identifying information for identifying the electronic documents and stores the electronic documents in the prescribed storage device. In an example shown in FIG. 1, the above-described prescribed storage device is a document managing system 3 connected to the information processor 30 through a communication path such as a LAN (Local Area Network). As the above-described document identifying information, for instance, text information extracted respectively from the electronic documents or serial numbers respectively assigned to the electronic documents or the like may be exemplified.

In this case, the output part 34 may divide the image information of the plurality of pages by a sorter or the like and print and output the image information.

The information processor 30 may further include a page number designation receiving part 36 and an output part 37.

The page number designation receiving part 36 receives a designation of the number of pages from a user.

The output part 37 divides the image information of the plurality of pages acquired by the first image information acquiring part 31 at intervals of the designated number of pages and outputs the divided image information. The output part 37 may store the image information in the prescribed storage device, print and output or display the image information.

(Specific Example of Dividing Process by Output Part 34)

Now, a specific example of a dividing process by the output part 34 will be described below.

FIRST EXAMPLE

In this example, the output part 34 divides the image information of the plurality of pages by setting a position between the specified page and a page one before the specified page as the division position to divide the image information of the plurality of pages.

Figure 2:
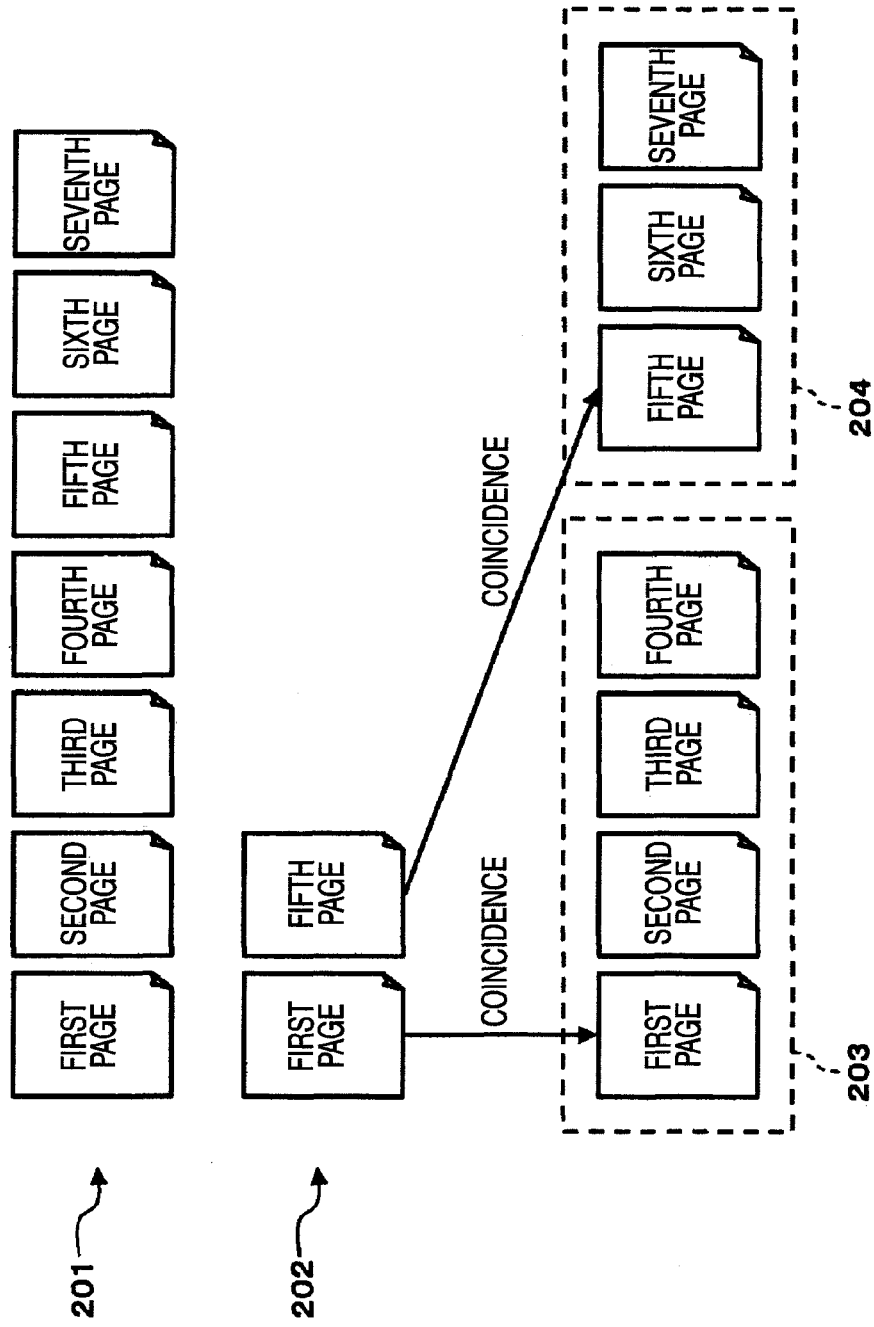
FIG. 2 is a conceptual view for explaining a first example of a dividing process by an output part 34.

FIG. 2 is a conceptual view for explaining the first example of the dividing process by the output part 34.

In FIG. 2, the copies of 7 pages are read to form the image information 201 of the 7 pages. Further, the copies of a first page and a fifth page selected from the copies or the 7 pages are read to from the image information 202. In this case, the first page and the fifth page of the 7 pages are specified by the specifying part 33 as the selected pages.

The output part 34 sets a position between the specified first page and a 0 th page (does not actually exist) one before the first page and a position between the specified fifth page and a fourth page one before the fifth page as the division positions to divide the image information of the 7 pages and output the image information. That is, the output part 34 outputs two document information by considering the image information 203 of the first to the fourth pages and the image information 204 of the fifth to the seventh pages to be respectively sets of document information.

In one form of a use of this example, the user allows the information processing system 1 to read the copies of the 7 pages in total including a first paper document of 4 pages and a second paper document of 3 pages that are arranged in order. Then, the user extracts the top page (the first page) of the first paper document and the first page (the fifth page) of the second paper document of the copies of the 7 pages and allows the information processing system 1 to read them. Then, the image information corresponding to the first paper document and the image information corresponding to the second paper document are separated from each other and outputted by the information processing system 1.

In this example, the selection of the copy of the first page may be omitted.

SECOND EXAMPLE

In this example, the output part 34 sets a position between the specified page and a page one after the specified page as the division position to divide the image information of the plurality of pages.

Figure 3:
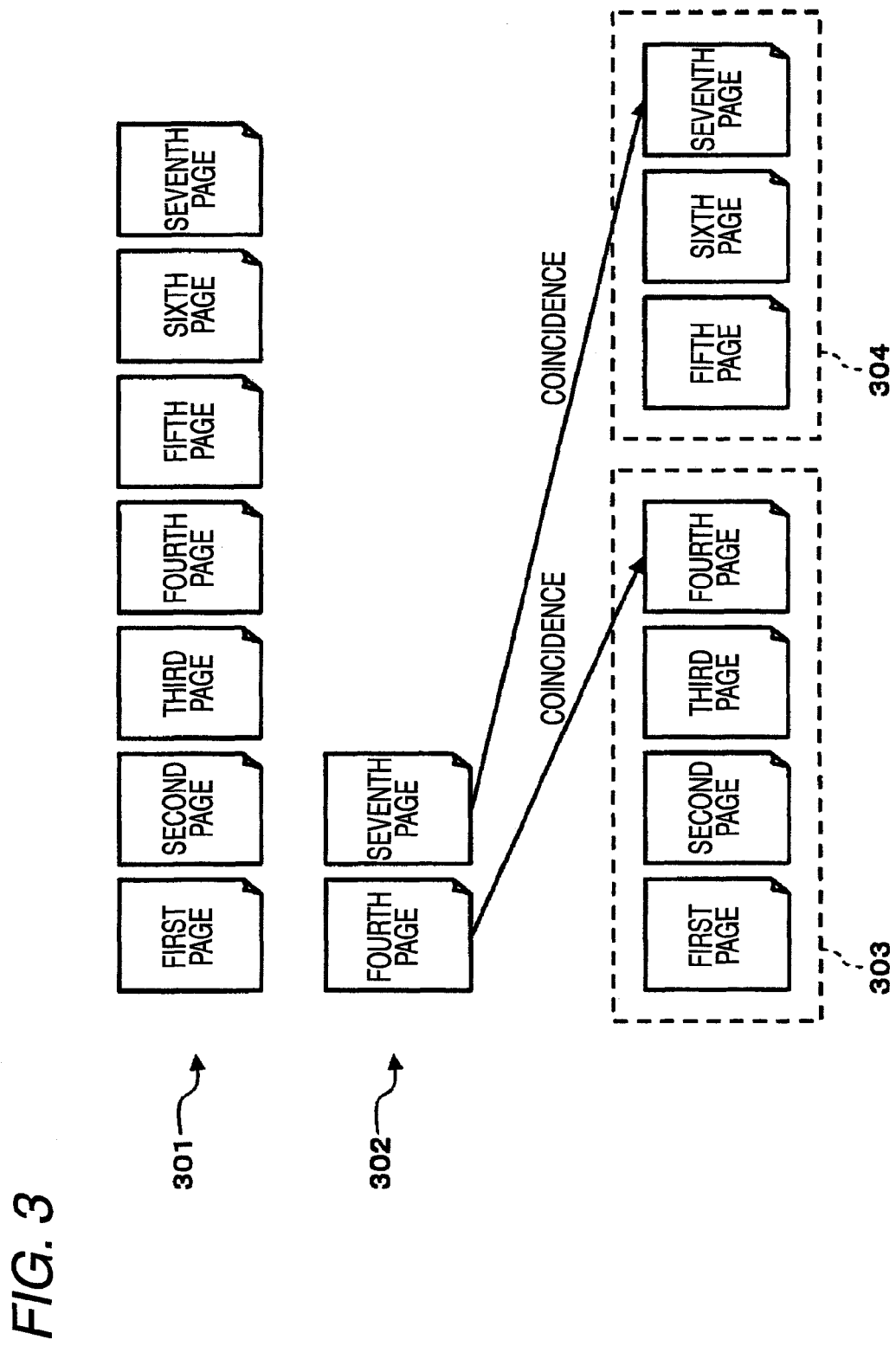
FIG. 3 is a conceptual view for explaining a second example of the dividing process by the output part 34.

FIG. 3 is a conceptual view for explaining a second example of the dividing process by the output part 34.

In FIG. 3, the copies of 7 pages are read to form the image information 301 of the 7 pages. Further, the copies of a fourth page and a seventh page selected from the copies or the 7 pages are read to from the image information 302. In this case, the fourth page and the seventh page of the 7 pages are specified by the specifying part 33 as the selected pages.

The output part 34 sets a position between the specified fourth page and a fifth page one after the fourth page and a position between the specified seventh page and an eighth page (does not actually exist) one after the seventh page as the division positions to divide the image information of the 7 pages and output the image information. That is, the output part 34 outputs two document information by considering the image information 303 of the first to the fourth pages and the image information 304 of the fifth to the seventh pages to be respectively sets of document information.

In one form of a use of this example, the user allows the information processing system 1 to read the copies of the 7 pages in total including a first paper document of 4 pages and a second paper document of 3 pages that are arranged in order. Then, the user extracts the last page (the fourth page) of the first paper document and the last page (the seventh page) of the second paper document of the copies of the 7 pages and allows the information processing system 1 to read them. Then, the image information corresponding to the first paper document and the image information corresponding to the second paper document are separated from each other and outputted by the information processing system 1.

In this example, the selection of the copy of the seventh page may be omitted.

(Specific Example of Dividing Process by Output Part 37)

Figure 4:
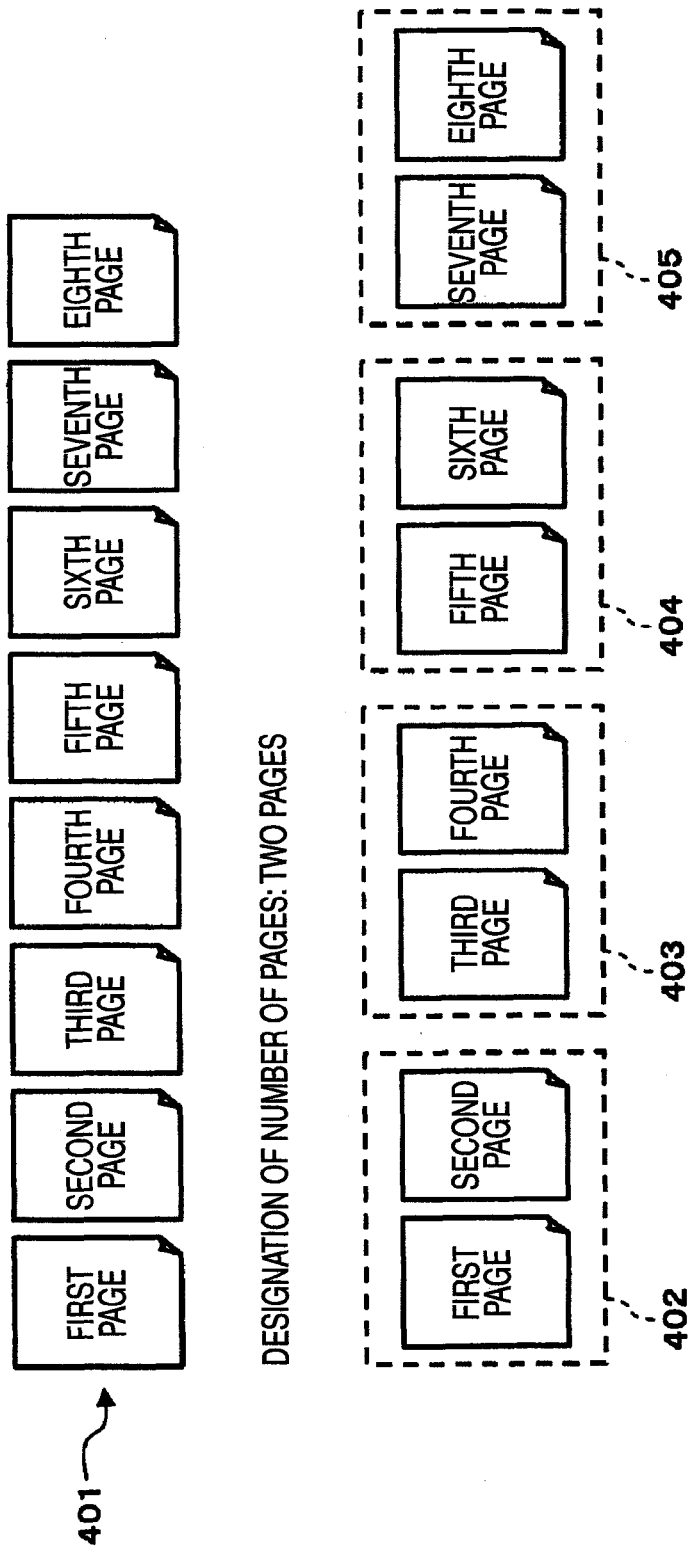
FIG. 4 is a conceptual view for explaining one example of a dividing process by an output part 37.

FIG. 4 is a conceptual view for explaining one example of a dividing process by the output part 37. Now, referring to FIG. 4, the one example of the dividing process by the output part 37 will be described below.

In FIG. 4, copies of 8 pages are read to form the image information 401 of the 8 pages. Further, the page number designation receiving part 36 receives the designation of two pages as the designation of the number of pages.

The output part 37 divides the image information 401 of the 8 pages at intervals of the two pages and outputs the divided image information. That is, the output part 37 outputs four document information by considering the image information 402 of first to second pages, the image information 403 of third to fourth pages, the image information 404 of fifth to sixth pages and the image in formation 405 of seventh to eighth pages to be respectively sets of the document information.

In one form of a use of this example, the user allows the information processing system 1 to read the copies of the 8 pages in total including first to fourth paper documents respectively composed of the two pages that are arranged in order. Further, the user designates the number of pages "2" to the information processing system 1. Thus, four image information corresponding to the first to the fourth paper documents are separated from each other and outputted by the information processing system 1.

(Operation of Information Processing System)

Figure 5:
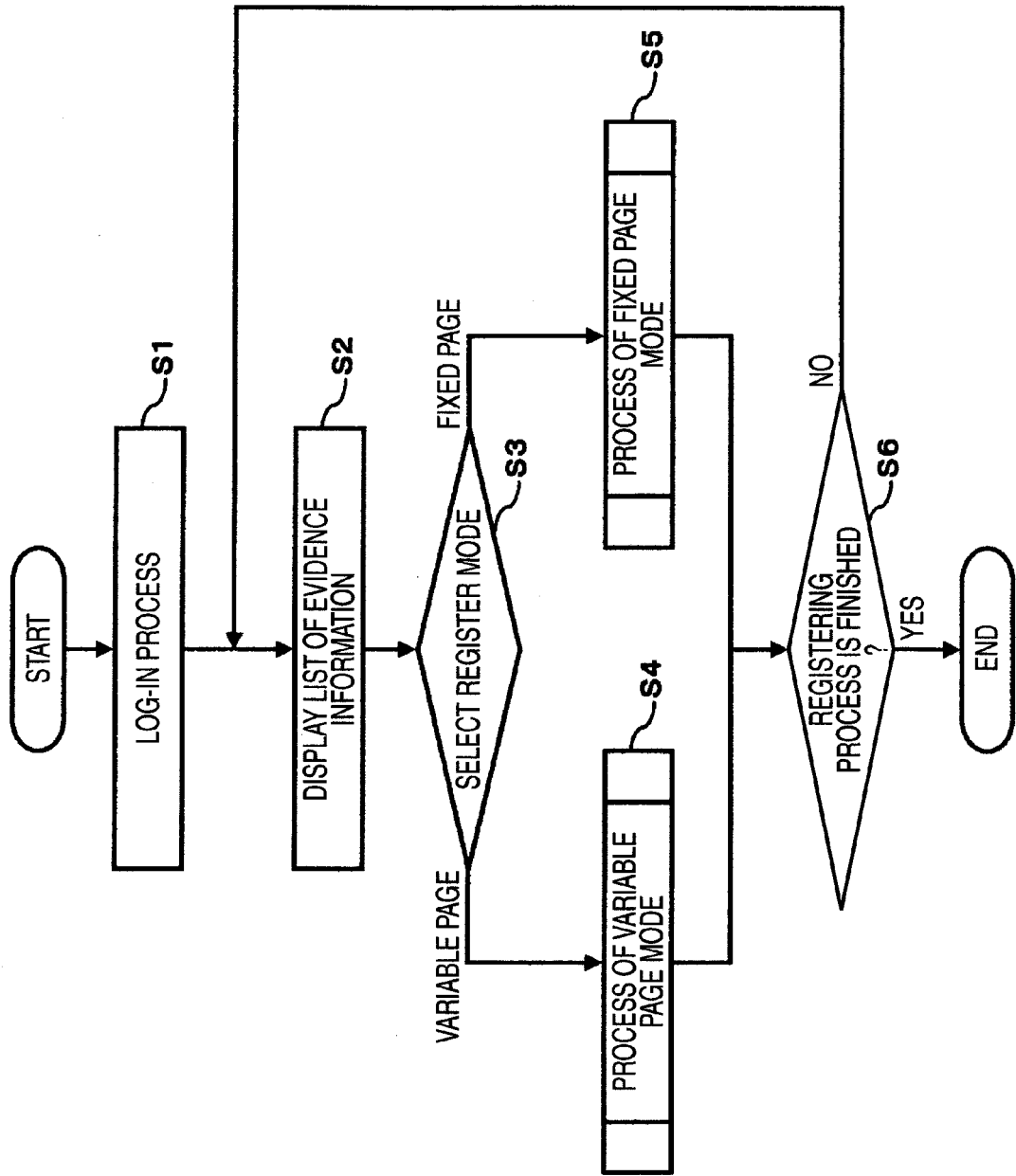
FIG. 5 is a flowchart showing one example of a procedure of an operation of the information processing system according to the embodiment.

FIG. 5 is a flowchart showing one example of a procedure of an operation of the information processing system 1 according to this embodiment. Now, referring to FIG. 5, one example of the operation of the information processing system 1 will be described below.

In this example, to the information processing system 1, a business information managing system 2 and the document managing system 3 are connected through the communication path such as the LAN.

The business information managing system 2 associates user identifying information (refer it to as a "user ID", hereinafter) for identifying the user with the business information of the user and stores the associated information. The business information includes at least one evidence information. The evidence information includes information showing the kinds of the proofs (a written estimate or an order form, etc.) and the serial numbers of the proofs.

The document managing system 3 associates the electronic document with document identifying information for identifying the document and stores the associated information.

Referring to FIG. 5, the information processing system 1 (for instance, a compound machine) initially carries out a log-in process (S1). Specifically, the information processing system 1 receivers user certifying information including the user ID of the user through a user interface (for instance, a touch panel type liquid crystal display provided in the compound machine) from the user. Then, the information processing system 1 certifies the user on the basis of the user certifying information.

When the information processing system 1 succeeds in certifying the user, the information processing system 1 acquires the list of the evidence information associated with the user ID from the business information managing system 2 to display the list of the evidence information on the user interface (S2).

Further, the information processing system 1 receives a selection of a register mode from the user through the user interface (S3). In this embodiment, the register mode includes a variable page mode and a fixed page mode.

When the variable page mode is selected, the information processing system 1 carries out a below-described variable page process (S4). When the fixed page mode is selected, the information processing system 1 carries out a below-described fixed page process (S5).

When the variable page process or the fixed page process is finished, the information processing system 1 receives from the user an instruction as to whether or not a register process is finished through the user interface (S6). When the user instructs to finish the register process, the information processing system 1 finishes the process. When the user does not instruct to finish the register process, the information processing system returns a process to the step S2.

(Variable Page Mode)

Figure 6:
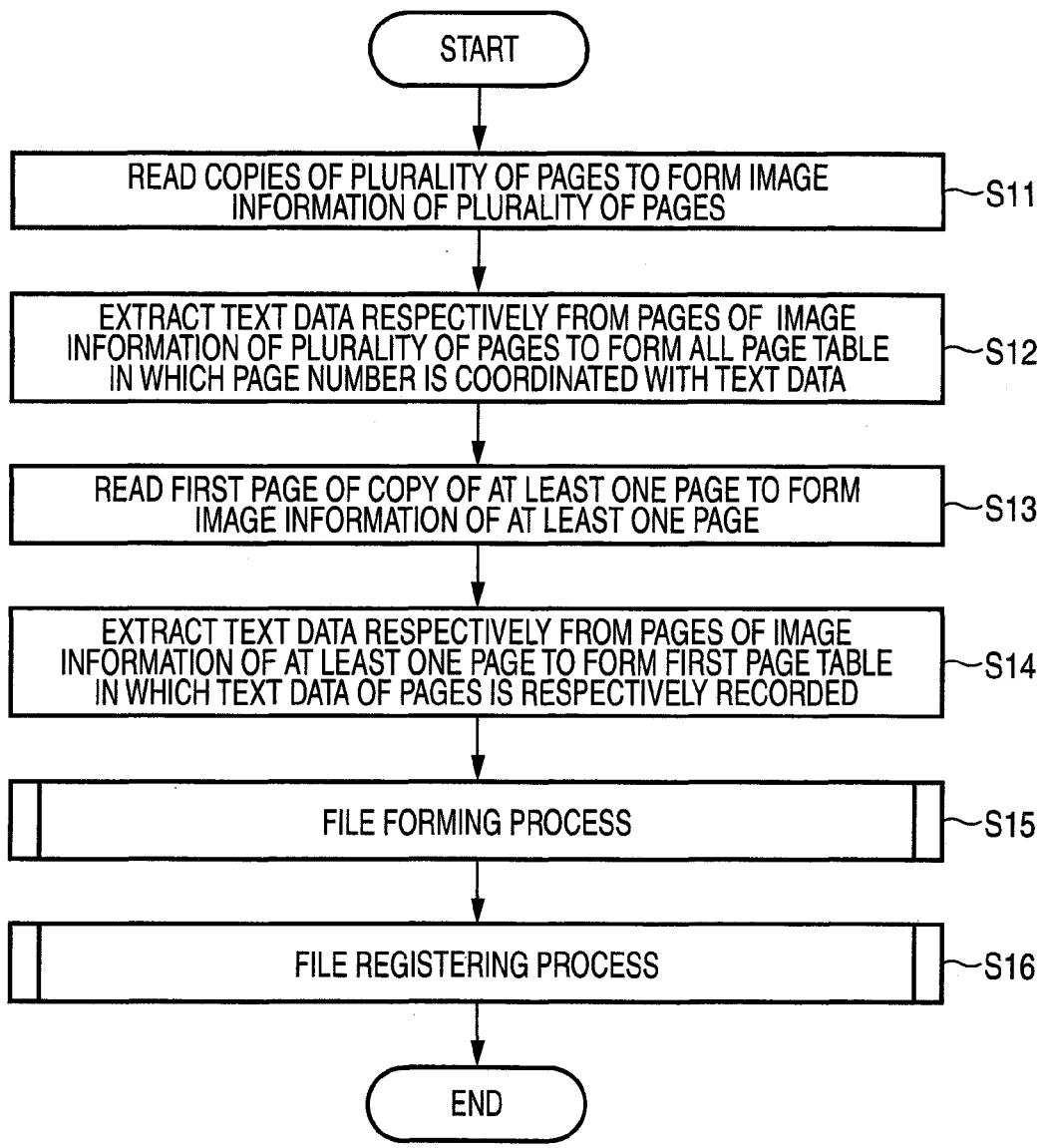
FIG. 6 is a flowchart showing one example of a process of a variable page mode.

FIG. 6 is a flowchart showing one example of a process of the variable page mode. Now, referring to FIG. 6, one example of the process of the variable page mode will be described below.

The user sets the copies of the plurality of pages having a plurality of proofs laminated in order to an automatic copy feeder of the information processing system 1 and instructs the information processing system 1 to scan the copies. The proofs are respectively one or a plurality of paper copies.

The information processing system 1 reads the set copies of the plurality of pages in order by the automatic copy feeder to form the image information of the plurality of pages (S11).

Then, the information processing system 1 carries out an OCR (character recognition by an optical method: Optical Character Recognition) process to the formed image information of all pages to extract text data respectively from the pages and form an all page table in which page numbers of the pages are respectively associated with the text data extracted respectively from the pages and recorded (S12).

Then, the user extracts the first pages of the proofs respectively from the copies of the plurality of pages, sets the copy of at least one page in which the first pages of the proofs are respectively laminated in order to the automatic copy feeder of the information processing system 1 and instructs the information processing system 1 to scan the copy.

Then, the information processing system 1 reads the set copy of at least one page by the automatic copy feeder to form the image information of at least one page (S13).

Then, the information processing system 1 carries out the OCR process to the formed image information of at least one page to extract text data respectively from the pages and form a first page table in which the text data (refer it to as "text data of first page", hereinafter) extracted respectively from the pages is recorded (S14).

Subsequently, the information processing system carries out a file forming process shown in FIG. 7 (S15).

Figure 7:
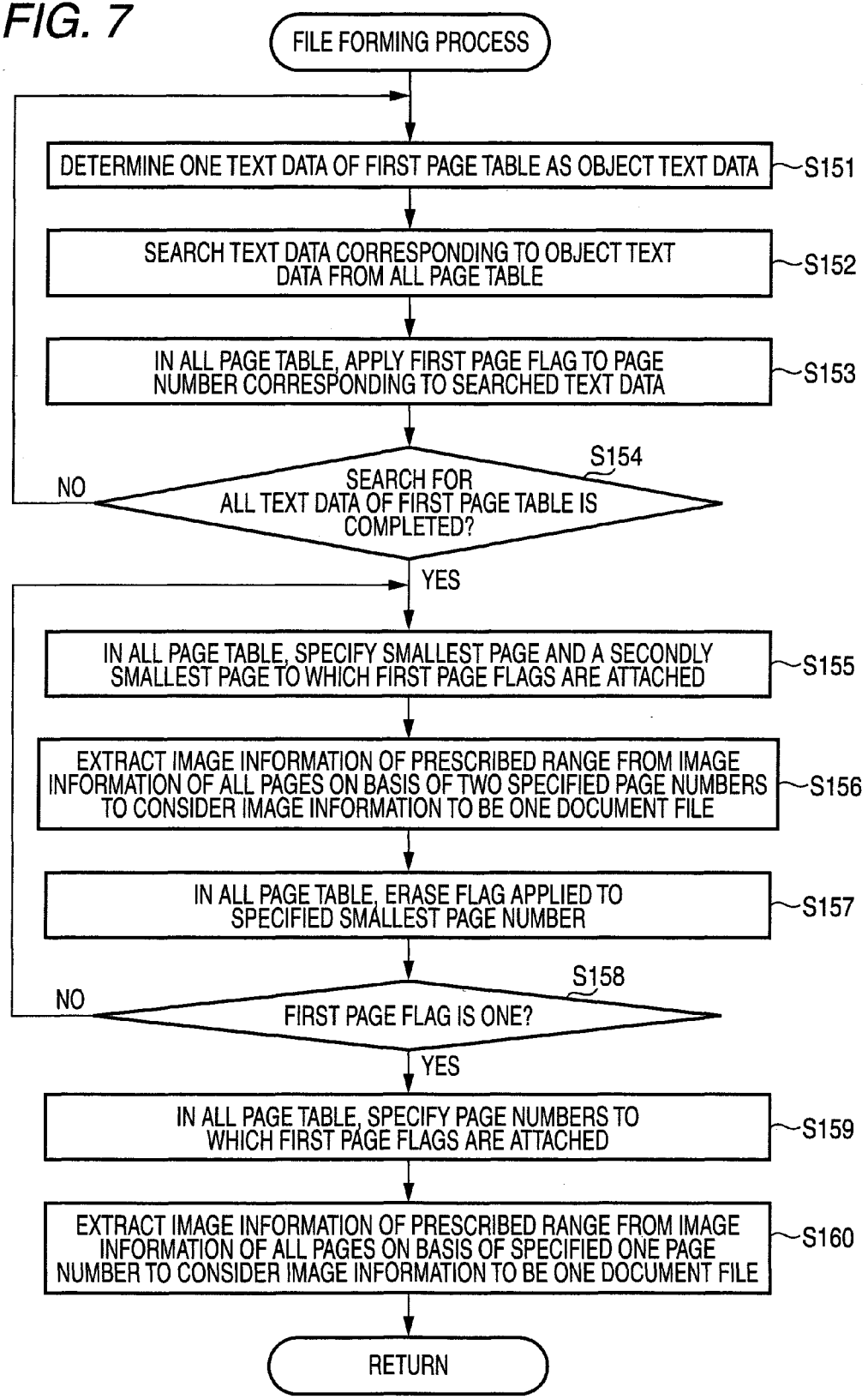
FIG. 7 is a flowchart showing a file forming process.

Referring to FIG. 7, the information processing system 1 considers data of the text data of the first pages recorded in the first page table that is not determined yet as object text data to be the object text data (S151).

Then, the information processing system 1 compares the object text data with the text data of the pages respectively recorded in the all page table to search the text data corresponding to the object text data from the all page table (S152).

Then, the information processing system 1 gives a first page flag to the page number corresponding to the text data searched in the above-described step S152 in the all page table (S153).

Then, the information processing system 1 decides whether or not a search is completed for all the text data recorded in the first page table (S154). When the information processing system 1 decides that the search is not completed (S154: NO), the information processing system 1 returns the process to the step S151. When the information processing system 1 decides that the search is completed (S154: YES), the information processing system 1 advances the process to step S155.

In the step S155, the information processing system 1 specifies the smallest page number and a secondly smallest page number of the page numbers to which the first page flags are given in the all page table.

Then, the information processing system 1 extracts the image information of a prescribed range from the image information of all the pages on the basis of the two specified page numbers to consider the image information to be one document file (S156). Here, the above-described range indicates a range from a page corresponding to the specified smallest page number to a page one before a page corresponding to the specified secondly smallest page number.

Then, the information processing system 1 erases the first page flag given to the specified smallest page number in the all page table (S157).

Then, the information processing system 1 decides whether or not the number of the first page flags is one in the all page table (S158). When the information processing system 1 decides that the number of the first page flags is not one (S158: NO), the information processing system 1 returns the process to the step S155. When the information processing system 1 decides that the number of the first page flags is one (S158: YES), the information processing system 1 advances the process to step S159.

In the step S159, the information processing system 1 specifies the page number to which the first page flag is attached in the all page table.

Then, the information processing system 1 extracts the image information of a prescribed range from the image information of all the pages on the basis of the specified one page number to consider the image information to be one document file (S160) and finish the file forming process. Here, the prescribed range indicates a range from a page corresponding to the specified page number of the last page.

Figure 8:
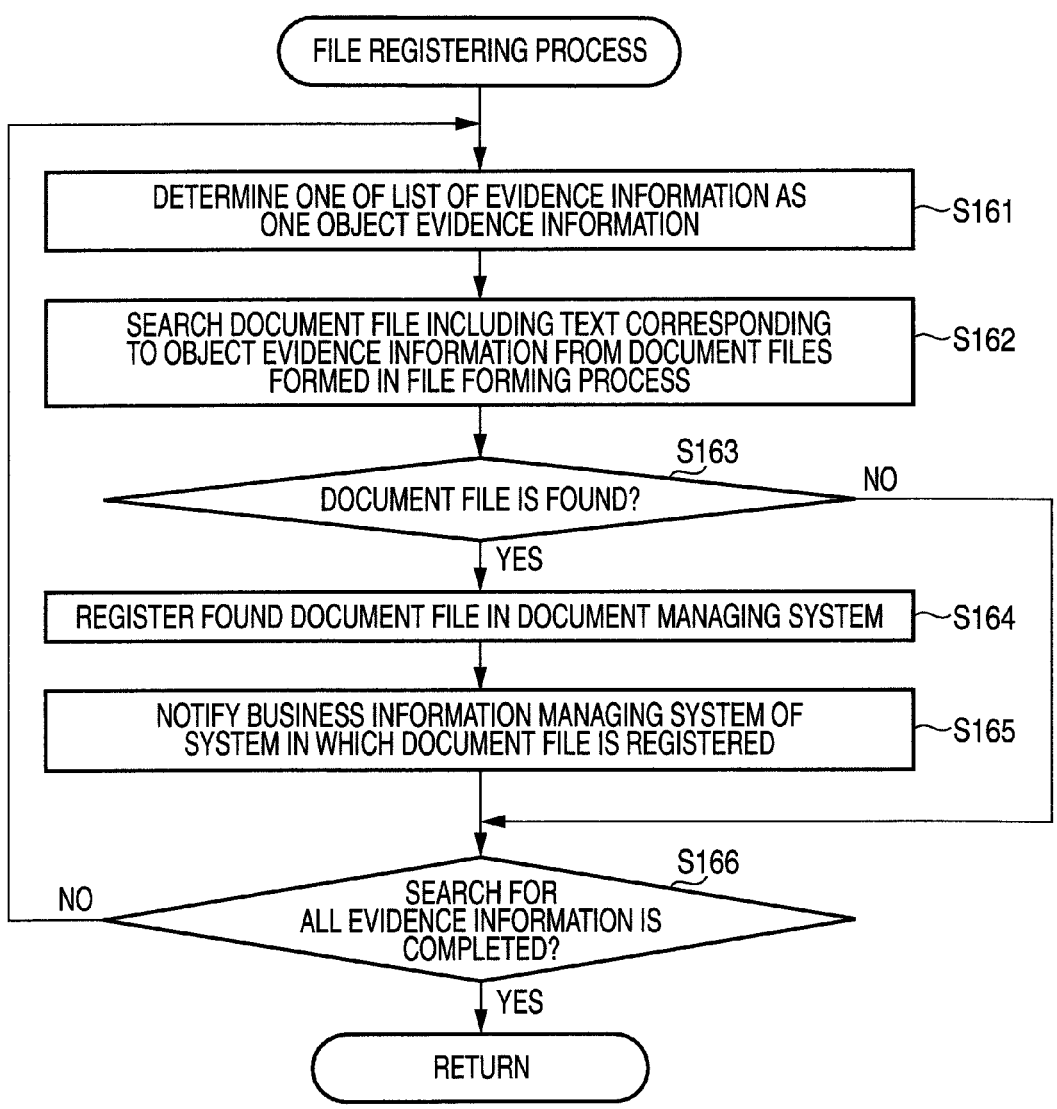
FIG. 8 is a flowchart showing a file registering process.

Referring again to FIG. 6, after the file forming process is finished, the information processing system 1 carries out a file registering process shown in FIG. 8 (S16).

Referring to FIG. 8, the information processing system 1 considers the evidence information of the list of the evidence information acquired in the step S12 that is not determined yet as object evidence information to be the object evidence information (S161).

Then, the information processing system 1 searches the document file including a text corresponding to the object evidence information from the document files formed in the above-described file forming process (S162). At this time, the information processing system 1 may refer to the all page table.

Then, the information processing system 1 decides whether or not the document file is found (S163).

When the document file is found (S163: YES), the information processing system 1 associates the document file with the object evidence information and registers the document file in the document managing system 3 (S164), associates the system 3 in which the document file is registered with the object evidence information and notifies the business information managing system 2 of the system in which the document file is registered (S165). Then, the information processing system 1 advances the process to step S166.

On the other hand, when the document file is not found (S163: NO), the information processing system 1 advances the process to the step S166.

In the step S166, when the information processing system 1 decides whether or not a search is completed for all evidence information. When the information processing system 1 decides that the search is not completed for all the evidence information (S166:NO), the information processing system 1 returns the process to the step S161. When the information processing system 1 decides that the search is completed (S166: YES), the information processing system 1 finishes the process.

In the above-described example, after all the pages are read, the first pages are read, however, all the pages may be read after the first pages are read.

(Fixed Page Mode)

Figure 9:
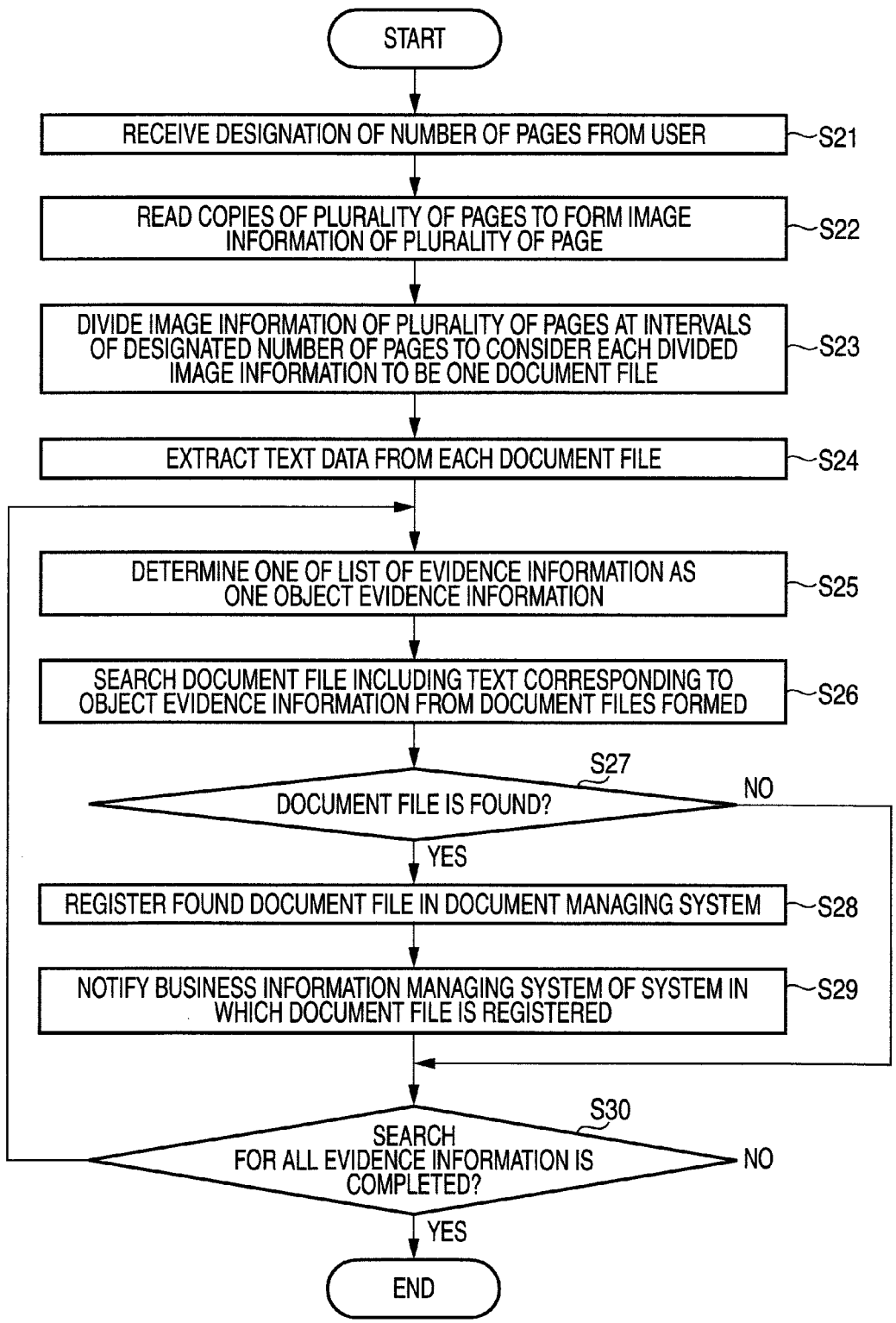
FIG. 9 is a flowchart showing one example of a process of a fixed page mode.

FIG. 9 is a flowchart showing one example of a process of a fixed page mode. Now, referring to FIG. 9, one example of the process of the fixed page mode will be described below.

The information processing system 1 receives the designation of the number (an integer of 1 or more) of pages from the user through the user interface (S21).

Then, the user sets the copies of the plurality of pages having the plurality of proofs laminated in order in the automatic copy feeder of the information processing system 1 and instructs the information processing system 1 to scan the copies. Here, the numbers of pages of the proofs are respectively equal to each other. For instance, the copies of the plurality of pages indicate copies of 8 pages in total in which four proofs respectively including two pages are laminated in order.

The information processing system 1 reads the set copies of the plurality of pages in order by the automatic copy feeder to form the image information of the plurality of pages (S22).

Then, the information processing system 1 divides the image information of the plurality of pages at intervals of the designated number of pages to consider each of the divided image information to be one document file (S23).

Then, the information processing system 1 applies the OCR process to all the formed document files to extract the text data respectively from the document files (S24).

Then, the information processing system 1 determines evidence information of the list of the evidence information acquired in the step S12 that is not yet determined as object evidence information as the object evidence information (S25).

After that, the information processing system 1 searches the document file including a text corresponding to the object evidence information from the formed document files on the basis of the text data extracted respectively from the document files (S26).

Then, the information processing system 1 decides whether or not the document file is found (S27).

When the document file is found (S27: YES), the information processing system 1 associates the document file with the object evidence information and registers the document file in the document managing system 3 (S28), associates the system 3 in which the document file is registered with the object evidence information and notifies the business information managing system 2 of the system in which the document file is registered (S29). Then, the information processing system 1 advances the process to step S30.

On the other hand, when the document file is not found (S27: NO), the information processing system 1 advances the process to the step S30.

In the step S30, when the information processing system 1 decides whether or not a search is completed for all evidence information. When the information processing system 1 decides that the search is not completed for all the evidence information (S30: NO), the information processing system 1 returns the process to the step S25. When the information processing system 1 decides that the search is completed (S30: YES), the information processing system 1 finishes the process.

The present invention is not limited to the above-described embodiment and various changes may be made within a scope of the present invention without departing the gist of the invention.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processor comprising:
   a first acquiring unit that acquires first electronic image information of a plurality of pages formed by reading the plurality of pages with an image reading unit;
   a second acquiring unit that acquires second electronic image information of a plurality of pages read by the image reading unit; and
   a comparing unit that compares the first electronic image information with the second electronic image information;
   a specifying unit that, if a page of the first electronic image information corresponds with the second electronic image information as a result of comparing by the comparing unit, specifies said page as a division page of the first electronic image information;
   an outputting unit that divides the first electronic information based on the division page specified by the specifying unit into a first subset of the first electronic image information and a second subset of the first electronic image information, and outputs the first electronic image information divided into the first subset and the second subset.

2. An information processing system comprising:
   a first reading unit that reads a plurality of pages to form first electronic image information of the plurality of pages;
   a second reading unit that reads a plurality of pages read by the first reading unit to form second electronic image information;
   a comparing unit that compares the first electronic image information with the second electronic image information;
   a specifying unit that, if a page of the first electronic image information corresponds with the second electronic image information as a result of comparing by the comparing unit, specifies said page as a division page of the first electronic image information; and
   a storage that stores the first electronic image information as a first subset of the first electronic image information and a second subset of the first electronic image information, the first electronic information divided into the first subset and the second subset in accordance with the division page set as a point of division of the first electronic image information.

3. A non-transitory computer readable medium storing a program causing a computer to execute a process for performing an information processing, the process comprising:
   acquiring first electronic image information of a plurality of pages formed by reading the plurality of pages with an image reading unit;
   acquiring second electronic image information of a plurality of pages read by the image reading unit;
   comparing the first electronic image information with the second electronic image information;
   specifying, if a page of the first electronic image information corresponds with the second electronic image information as a result of the comparing, said page as a division page of the first electronic image information;
   dividing the first electronic information based on the division page into a first subset of the first electronic image information and a second subset of the first electronic image information; and
   outputting the first electronic image information divided into the first subset and the second subset.

4. A non-transitory computer readable medium storing a program causing a computer to execute a process for performing an information processing, the process comprising:
   reading a plurality of pages with an image reading unit to form first electronic image information of the plurality of pages;
   reading a plurality of pages read by the image reading unit to form second electronic image information;
   comparing the first electronic image information with the second electronic image information;
   specifying, if a page of the first electronic image information corresponds with the second electronic image information as a result of the comparing, said page as a division page of the first electronic image information; and
   storing the first electronic image information as a first subset of the first electronic image information and a second subset of the first electronic image information, the first electronic information divided into the first subset and the second subset in accordance with the division page set as a point of division of the first electronic image information.

* * * * *